(12) United States Patent
Rapeanu

(10) Patent No.: US 6,563,721 B1
(45) Date of Patent: May 13, 2003

(54) POWER SUPPLY WITH MULTIPLE AC INPUT VOLTAGES

(75) Inventor: Radu Rapeanu, Montreal (CA)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/709,213

(22) Filed: Nov. 9, 2000

Related U.S. Application Data

(60) Provisional application No. 60/164,518, filed on Nov. 10, 1999.

(51) Int. Cl.[7] .............................. H02M 3/335; H02J 3/00
(52) U.S. Cl. ..................... 363/34; 363/21.11; 323/222
(58) Field of Search .............................. 363/34, 37, 40, 363/41, 50, 56, 142, 55, 21.01; 323/255, 237, 901, 222

(56) References Cited

U.S. PATENT DOCUMENTS

| | | | | |
|---|---|---|---|---|
| 3,660,749 A | | 5/1972 | Kadri | |
| 3,803,382 A | * | 4/1974 | Tajbi et al. | 219/135 |
| 4,051,425 A | * | 9/1977 | Smith | 363/86 |
| 4,084,219 A | | 4/1978 | Furukawa et al. | |
| 4,090,234 A | * | 5/1978 | Bierly | 363/88 |
| 4,162,524 A | | 7/1979 | Jansson | |
| 4,307,332 A | * | 12/1981 | Lorenzo et al. | 323/246 |
| 4,321,662 A | * | 3/1982 | Yokoyama | 363/86 |
| 4,389,702 A | * | 6/1983 | Clamento et al. | 363/56 |
| 4,607,324 A | * | 8/1986 | Gibbons | 363/44 |
| 4,843,301 A | * | 6/1989 | Belanger | 323/299 |
| 5,001,623 A | * | 3/1991 | Magid | 363/143 |
| 5,239,453 A | | 8/1993 | Remson | |
| 5,611,163 A | | 3/1997 | Smith | |
| 5,638,263 A | * | 6/1997 | Opal et al. | 363/65 |
| D383,501 S | | 9/1997 | Andre et al. | |
| 5,945,820 A | | 8/1999 | Namgoong et al. | |
| 6,011,702 A | | 1/2000 | Gucyski | |
| 6,088,250 A | | 7/2000 | Siri | |
| 6,104,173 A | | 8/2000 | Kojima | |
| 6,108,226 A | * | 8/2000 | Ghosh et al. | 363/142 |
| 6,160,721 A | * | 12/2000 | Kossives et al. | 363/21.01 |

* cited by examiner

Primary Examiner—Rajnikant B. Patel
(74) Attorney, Agent, or Firm—Hoffmann & Baron, LLP

(57) ABSTRACT

The present invention provides a simple circuit for a DC power supply. The power supply circuit of the present invention includes a transformer in combination with a switching power supply circuit. The transformer includes a primary winding to which a wide range of AC input voltages is applied and a secondary winding for supplying the resultant AC voltage range as an input voltage to the switching power supply circuit. The switching power supply circuit further includes an input terminal having the input voltage applied thereto by the secondary winding and further having an output terminal from which a DC power supply output is generated. The transformer can be selected from a group of transformers consisting of step-down, step-up and repeater transformers. The switching power supply circuit may be selected from any convention switching power supply circuit including step-up, step, down and inverter converters, and combinations thereof, or even linear configurations.

6 Claims, 4 Drawing Sheets

POWER SUPPLY WITH MULTIPLE AC INPUT VOLTAGES

This application claims the benefit of Provisional application Ser. No. 60/164,518, filed Nov. 10, 1999.

FIELD OF THE INVENTION

In general, the present invention relates to a DC power supply with multiple AC input voltages. More particularly, the present invention is directed to a simple circuit for a DC power supply having only two wires from an AC input that can be connected to any voltage within a wide range of AC input voltages.

BACKGROUND OF THE INVENTION

In industrial applications, DC power supplies such as DC/DC converters must adapt to various AC input voltages. A multiple source power supply may be required in certain applications wherein the requisite output of a power supply is dependent upon the application of the device being supplied. A multiple source power supply may derive its source from multiple AC lines, one or more batteries or even solar collectors to power to a load connected at an output terminal.

Two conventional solutions for implementing multiple input power supplies that are well known and widely utilized in emergency lighting and related industries are illustrated herein in FIGS. 1 and 2. As illustrated in FIG. 1, one such solution implements an output transformer 10 to establish electrical communication of a multi-input transformer AC supply to a DC regulator. A plurality of input sources 12 is provided wherein each input source has a unique input voltage value. Input sources 12 are applied to primary windings 14 of output transformer 10. Power flows from each input source through a secondary winding 16 for derivation of a resultant voltage that is dependent upon which input source has been selected. Secondary winding 16 supplies this voltage as an input voltage $V_{in}$ to a power supply for rectification of such input voltage and production of a DC power supply therefrom. A second solution for effecting a similar result is further shown in FIG. 2, wherein power sources 12 are capacitively coupled to derive a resultant AC voltage that is subsequently input to a power supply circuit.

In each of the above configurations, it is often necessary for a user to manually select the input wires for the AC voltage available at installation. Even in industries where power supplies have only two AC wires, manual set-up for the input voltage is still required via incorporation of a multiple-position switch or "intelligent" power supplies having automated voltage selection (i.e., voltage level detector and electronic multi-switch). Because these solutions incorporate a multi-input circuit for various AC voltages, an undesirable selection must be made between manual set-up for a particular voltage or the use of sophisticated and costly automatic voltage selection techniques. Not only are additional costs incurred due to the expense of purchase, installation and maintenance of such voltage selection techniques. Inherent risks associated with the selection of an improper voltage can result in improper functioning of the circuit and possible damage to the system within which it is implemented, thereby incurring additional financial and personal risk.

It is therefore desirable to retain the range of AC input voltages that may be applied to a DC power supply circuit while minimizing the number of inputs thereinto. Such a power supply circuit advantageously obviates any restriction on predetermined AC input values.

SUMMARY OF THE INVENTION

It is an advantage of the present invention to provide a single input transformer AC supply to a switching power supply for generation of a constant DC output thereby.

It is another advantage of the present invention to provide such a single input to enable a switching power supply to deliver a constant DC output (voltage or current) for a large AC voltage range.

In the fulfillment of these and other advantages, the present invention provides a simple circuit for a DC power supply. The power supply circuit of the present invention includes a transformer in combination with a switching power supply circuit. The transformer includes a primary winding to which a wide range of AC input voltages is applied and a secondary winding for supplying the resultant AC voltage range as an input voltage to the switching power supply circuit. The switching power supply circuit further includes an input terminal having the input voltage applied thereto by the secondary winding and further having an output terminal from which a DC power supply output is generated. The transformer can be selected from a group of transformers consisting of step-down, step-up and repeater transformers.

The switching power supply circuit may be selected from any conventional switching power supply circuit including step-up, step-down and inverter converters, and combinations thereof, or even linear configurations. The switching power supply circuit may alternately be a self-supplied DC/DC switching power supply circuit having an igniter circuit in electrical communication with a control circuit. The igniter circuit delivers a minimum activation voltage to the control circuit for a predetermined time duration sufficient for activation of the control circuit. After the time duration lapses, the power supply output voltage supplies the control circuit with a stable DC voltage independent of the input voltage.

DETAILED DESCRIPTION OF THE PREFERRED EMBODIMENT

The present invention provides a DC power supply circuit that accommodates a wide range of AC input voltages. The present invention eliminates the necessity for manual input voltage selection without restricting the magnitude of input voltage values. Such advantages are desirable in a variety of industrial applications wherein an AC input may be made from one or more power input sources and a power supply must derive a DC output based upon distinct input voltage values.

Figure 1:
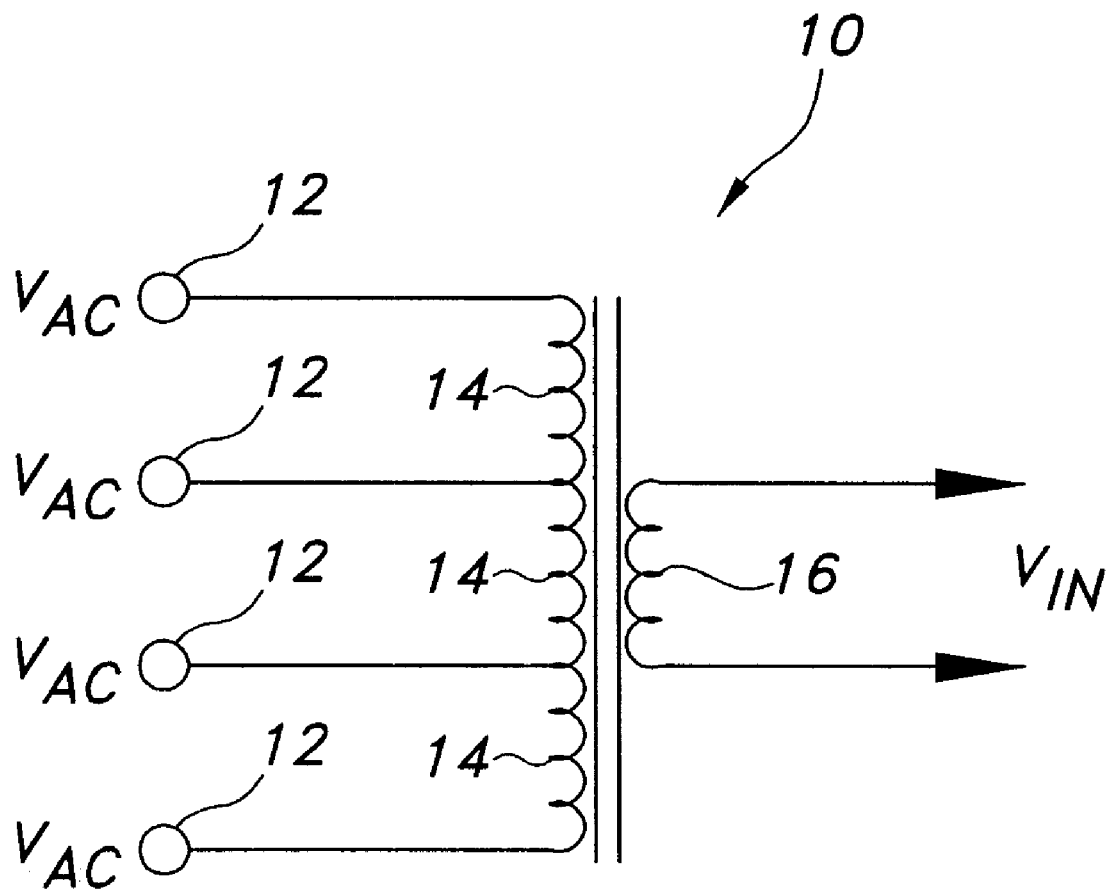
FIG. 1 is a schematic of a conventional multiple-input transformer for an AC power supply.
Figure 2:
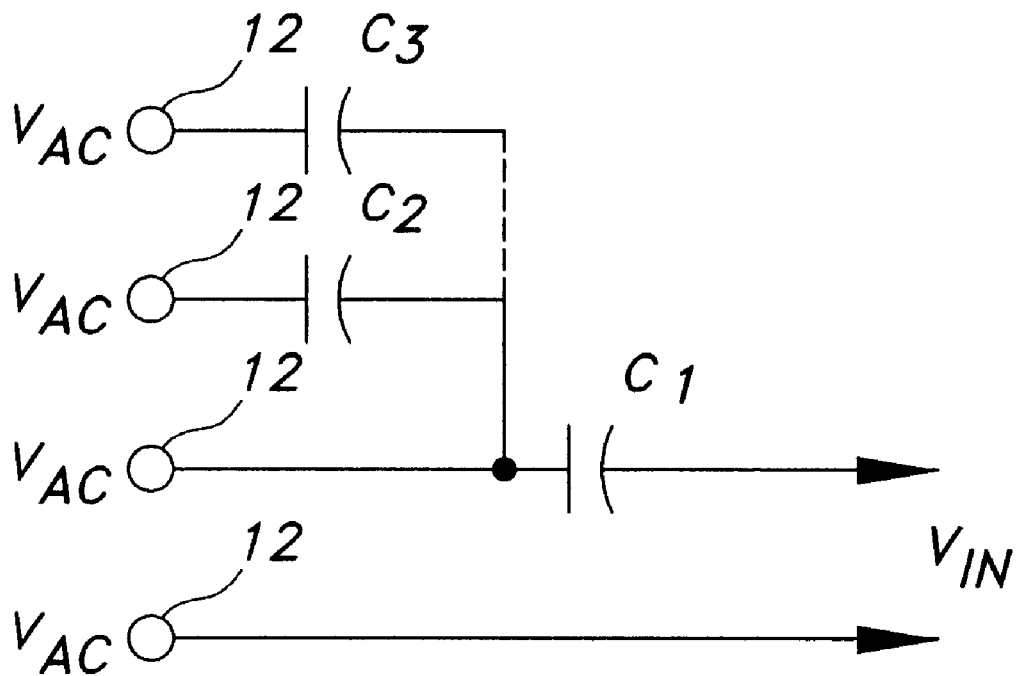
FIG. 2 is a schematic of a conventional multiple-input circuit having capacitor-coupled AC inputs.
Figure 3:
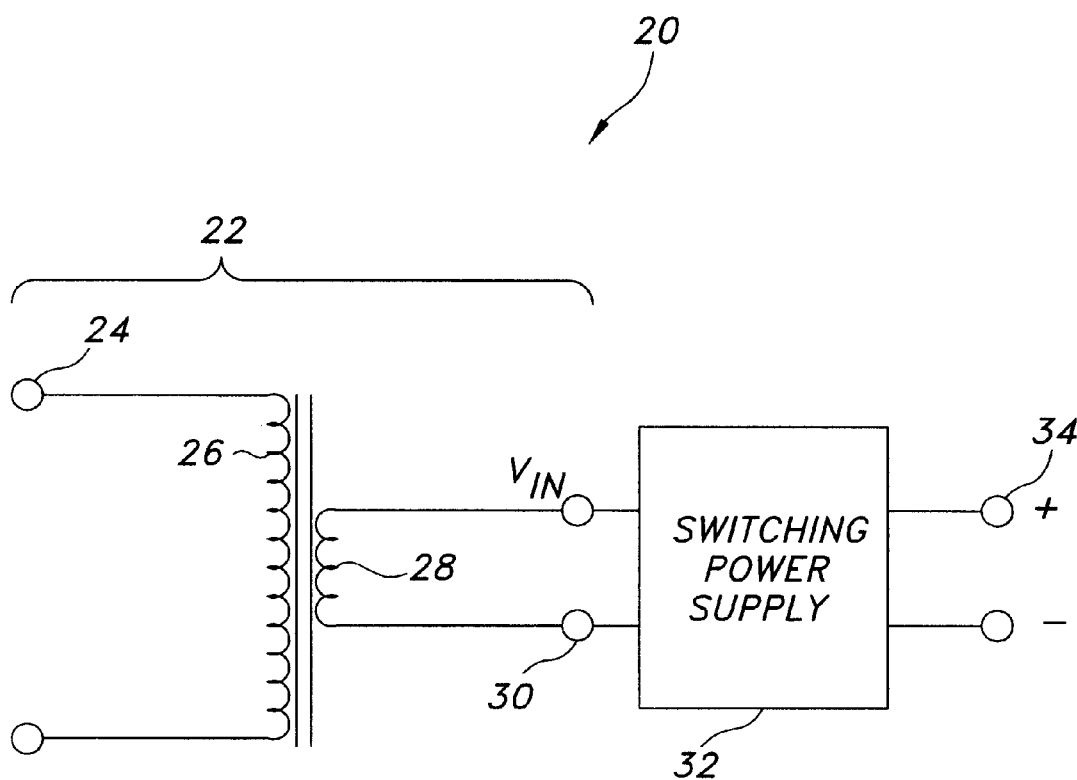
FIG. 3 is a circuit diagram of a step-down transformer and switching power supply of the present invention.

Now referring to the figures, wherein like elements are identically numbered, a preferred embodiment of a DC power supply circuit 20 of the present invention is provided in FIG. 3. Circuit 20 includes an input transformer 22 having an input terminal 24 at which an AC input power source is applied thereto. Such power source is applied to primary winding 26 to derive a primary voltage thereat. The power source at input terminal may come from one or more regular AC lines or further derived from an alternate AC power source such as an AC inverter or generator.

Transformer 22 further includes a secondary winding 28 in which a current is induced, thereby creating a secondary voltage thereacross. Secondary winding 28 supplies this voltage as an input voltage $V_{in}$ to an input terminal 30 of a switching power supply (SPS) circuit 30. SPS circuit 30 thereafter delivers a constant DC output (voltage or current) at an output terminal 34 thereof wherein such DC output remains constant over the range of AC voltages supplied by secondary winding 28.

Transformer 20 desirably has a normal input voltage configured to equal the maximum required input voltage (i.e., 400V AC). Transformer 20 also provides a constant transfer ratio at nominal output power for the entire input voltage range applied to input terminal 24 (i.e., at 100V AC input to deliver min. 10Vac/1A output and at 400Vac input to deliver min 40Vac/0.25A output). It is therefore understood that transformer 20 can have any turns ratio (i.e., step-down, step-up or repeater).

SPS circuit 32 is a standard circuit that delivers a constant DC output (voltage or current) for the AC voltage range (i.e., 10Vac–40Vac) supplied by secondary winding 28. SPS circuit 32 may therefore be selected from a variety of readily available step-up, step-down and inverter configurations, or any combination thereof. SPS circuit 32 may alternately be a linear power supply if so required by the application.

Figure 4:
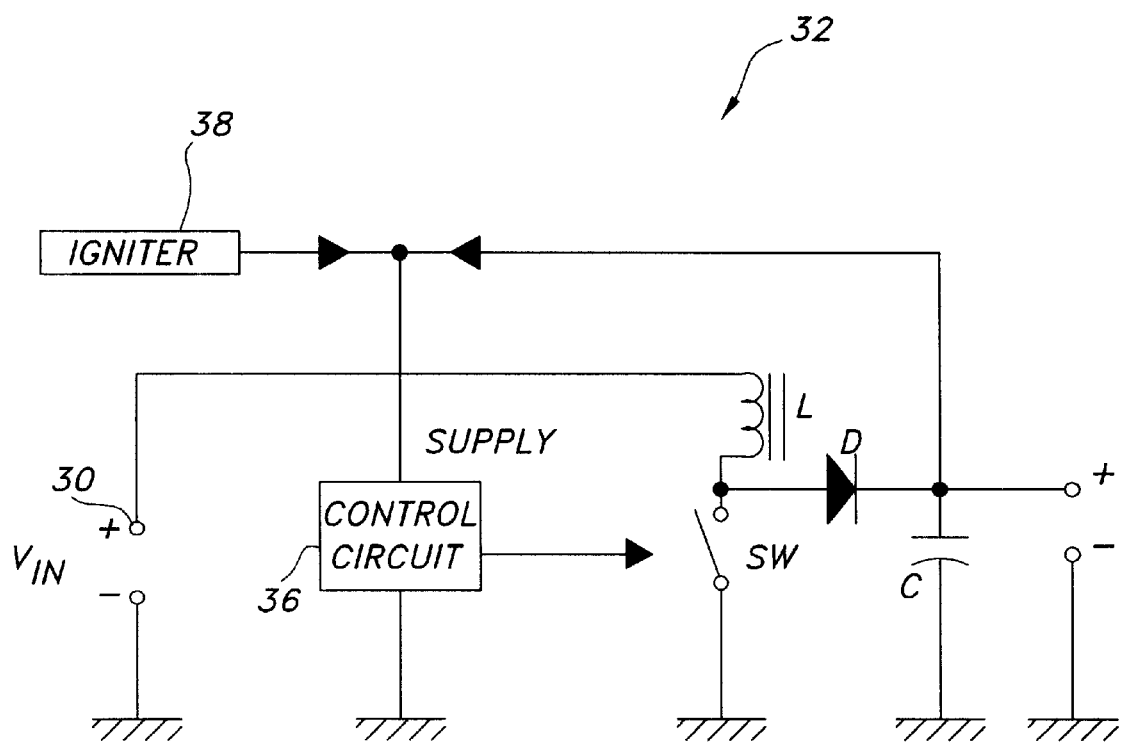
FIG. 4 is a circuit diagram of a self-supplied switching power supply.

SPS 32 may alternately be a self-supplied switching power supply such as that disclosed in the commonly assigned U.S. Application entitled "Self-Supplied DC/DC Switching Power Supply", incorporated by reference herein and further illustrated in FIG. 4. As shown, SPS circuit 32 includes a control circuit 36 that can be selected from a plurality of readily available configurations that are well known in the art. An igniter circuit 38 in electrical communication with control circuit temporarily delivers a minimum activation voltage (i.e. about 1–2 V DC) to control circuit 36 for a limited time duration sufficient for activation thereof (i.e., 2–10 ms). Like control circuit 36, igniter circuit 38 may assume a variety of configurations as is commonly known in the art. Such SPS configuration may be desirable in emergency notification and similar applications wherein a power supply may be absent or deficient.

The present invention thereby provides a simple and cost-efficient design that is readily adaptable to a variety of applications without sacrificing the range of AC input voltages available for application thereto. The input transformer in combination with the switching power supply provides a unique input for any AC voltage within a wide selected range (i.e. 100Vac to 400Vac or larger) while maintaining the functionality of the switching power supply.

Various changes and modifications can be made to the present invention. It is intended that all such changes and modifications come within the scope of the invention as set forth in the following claims.

What is claimed is:

1. A power supply for delivering a constant DC output from a wide range of AC input voltages, said power supply comprising:

a transformer in combination with a switching power supply circuit, wherein said transformer includes a primary winding to which said wide range of AC input voltages is applied and a secondary winding for supplying said AC voltage range as an input voltage to said switching power supply;

wherein said switching power supply circuit includes an input terminal for acceptance of said wide range of AC input voltages from said secondary winding, an output terminal from which a stable DC power supply output voltage is generated independent of said AC input voltage, an igniter circuit in electrical communication with a control circuit for delivering a minimum activation voltage to said control circuit for a predetermined temporal duration sufficient for activation of said control circuit after which said temporal duration said power supply output voltage supplies said control circuit with said stable DC voltage.

2. The power supply of claim 1 wherein said switching power supply circuit is a self-supplied DC/DC switching power supply circuit.

3. The power supply of claim 2 wherein said switching power supply circuit is selected from the group of DC/DC converters consisting of step-down, step-up and inverter converters and any combination thereof.

4. The power supply of claim 2 wherein said switching power supply circuit is a linear power supply.

5. The power supply of claim 1 wherein said transformer is selected from the group of transformers consisting of step-down, step-up and repeater transformers.

6. The power supply of claim 1 wherein said transformer is a single input transformer.

* * * * *